United States Patent
Williams

[19]

[11] Patent Number: 6,116,684
[45] Date of Patent: Sep. 12, 2000

[54] ULTRA LIGHTWEIGHT CLOSED CELL FOAM BICYCLE SADDLE

[75] Inventor: Gilbert J. Williams, Aptos, Calif.

[73] Assignee: BleacherComfort LLC, Watsonville, Calif.

[21] Appl. No.: 09/092,355

[22] Filed: Jun. 5, 1998

Related U.S. Application Data

[60] Provisional application No. 60/048,794, Jun. 6, 1997.

[51] Int. Cl.[7] .................................................... B62J 1/18
[52] U.S. Cl. ................. 297/214; 297/195.1; 297/452.27; 297/DIG. 1
[58] Field of Search ............................... 297/195.1, 214, 297/452.27, 452.37, 452.48, DIG. 1

[56] References Cited

U.S. PATENT DOCUMENTS

| | | | |
|---|---|---|---|
| 3,844,611 | 10/1974 | Young | 297/214 |
| 4,012,072 | 3/1977 | Hansen | 297/214 X |
| 5,108,076 | 4/1992 | Chiarella | 297/214 |
| 5,203,607 | 4/1993 | Landi | 297/214 |
| 5,348,369 | 9/1994 | Yu | 297/214 |
| 5,383,705 | 1/1995 | Voigt | 297/211 |
| 5,720,518 | 2/1998 | Harrison | 297/214 |
| 5,855,415 | 1/1999 | Lilley, Jr. | 297/452.27 |
| 5,904,396 | 5/1999 | Yates | 297/214 |

OTHER PUBLICATIONS

Mills and Hwang, "The Multiple–Impact Performance of High–Density Polyethylene Foam", *Cellular Polymers*, 1989, p. 259–276.

Loverage and Mills, "The Mechanism of the Recovery of Impacted High Density Polyethylene Foam".

Zotefoams, "Introduction and Selection Guide".

*Primary Examiner*—Laurie K. Cranmer
*Attorney, Agent, or Firm*—James J. Leary; Carol D. Titus

[57] ABSTRACT

An improved bicycle saddle is made of a dual density, closed-cell, polymeric foam laminate. The upper layer is a lower density (1.5 to 5 pcf), closed-cell, polymeric foam for comfort, absorbing minor impacts and distributing impact stress over a larger surface to reduce fatigue. The lower layer is a higher density (5 to 7.2 pcf), closed-cell, polymeric foam to absorb major impacts and add structural stability to the bicycle saddle. Cushioning pads may be added inside the bicycle saddle for customizing fit. The preferred material for the upper and lower layers of the laminated, dual density bicycle saddle is a nitrogen blown, cross-linked, closed-cell, polyethylene foam. The dual density, closed-cell, polymeric foam laminate of the bicycle saddle provides improved impact attenuation. The laminate also reduces the weight of the bicycle saddle, improves comfort and reduces neck fatigue for the user. The polyethylene foam laminate also exhibits improved recovery after an impact. In a second impact at the same location, the bicycle saddle has approximately 80 percent of the original impact attenuation value and after repeated impacts it has approximately 70 percent of the original impact attenuation value. The bicycle saddle also provides superior resistance to environmental factors, including moisture, heat and damage from rough handling. The manufacturing method is a low pressure compression molding process which simultaneously shapes the bicycle saddle and laminates the upper and lower layers of the bicycle saddle shell.

18 Claims, 3 Drawing Sheets

ULTRA LIGHTWEIGHT CLOSED CELL FOAM BICYCLE SADDLE

CROSS REFERENCE TO OTHER APPLICATIONS

This application claims the benefit of US Provisional Patent Application Ser. No. 60/048,794 filed Jun. 6, 1997.

FIELD OF THE INVENTION

The present invention relates generally to bicycle saddles providing an improved impact attenuation system giving a more comfortable ride in both street or off road conditions in an ultra lightweight formulation.

BACKGROUND OF THE INVENTION

Bicycle saddles generally fall into two categories, either wide, well padded heavy duty coil spring models where comfort is more important than weight or narrow, minimally padded, lightweight, unsprung racing models where weight is more important than comfort.

Saddles primarily consist of an injection molded plastic shell carrier shaped to form the basic profile then covered with a layer of padding, usually a polyurethane foam or polyurethane foam and gel and a protective cover. Sprung saddles have coil springs inserted between the underside of the saddle shell and the rails which mount the saddle to the seat post to attenuate the shock load. Unsprung saddles have no springs and are connected directly to the rails which mount the saddle to the seat post and directly transmit shock loads.

Much effort has been expended testing padding materials on light unsprung saddles in an attempt to attenuate the shock load encountered in riding, the most popular solution is the "gel" saddle, which while being somewhat effective in absorbing shock incurs a weight penalty.

SUMMARY OF THE INVENTION

The present invention provides a bicycle saddle with a shell made of a laminated, dual density, closed-cell, foamed polymeric material. An upper layer of the bicycle saddle is made of a closed-cell, foamed polymeric material with a relatively low density for comfort, for absorption of minor impacts and for distributing the stress of a major impact over a larger surface. A lower layer of the bicycle saddle is made of a closed-cell, foamed polymeric material with a higher density for absorption of major impacts to the bicycle saddle and to provide a structurally stable shell for the bicycle saddle mounting rails. Intermediate layers may be included between the upper and lower layers. Additionally, pads of differing densities may be inserted between the upper and lower laminates or inserts may be added to the lower laminate of the bicycle saddle to provide zones to customize the comfort level.

The preferred material for both the upper and lower layers of the laminated, dual density bicycle saddle is a nitrogen blown, cross-linked, closed-cell, high-density polyethylene foam. In one particularly preferred embodiment, the upper layer of the bicycle saddle is made of polyethylene foam with a density of approximately 3.8 pcf and the lower layer is made of polyethylene foam with a density of approximately 5 pcf. In a second particularly preferred embodiment, the upper layer of the bicycle saddle is made of polyethylene foam with a density of approximately 1.5 pcf and the lower layer is made of polyethylene foam with a density of approximately 7 pcf. The high-density polyethylene foam selected for the bicycle saddle construction provides particularly advantageous material properties which cannot be realized with prior art bicycle saddle materials.

The nitrogen blown, cross-linked, closed-cell, high-density polyethylene foam laminate used in the bicycle saddle of the present invention provides greater impact attenuation than does polyurethane or polyurethane/gel. The superior attenuation properties of the laminate allow a bicycle saddle to be made that reduces the weight of the bicycle saddle to under 6 ounces, improves comfort and reduces fatigue for the user.

The polyethylene foam laminate also exhibits much better recovery behavior than do the bicycle saddle materials of the prior art. Recovery of the polyethylene foam material after minor impacts to the bicycle saddle is immediate and complete. Minor impacts do not measurably deteriorate the impact attenuation properties of the bicycle saddle. The polyethylene foam material also exhibits a significant amount of recovery after major impacts to the bicycle saddle. Within 24 hours after a major impact to the bicycle saddle, the polyethylene foam bicycle saddle material recovers to the point that the impact attenuation performance for a second impact at the same site on the bicycle saddle is approximately 80 percent of the original impact attenuation value. After repeated impacts at the same site on the bicycle saddle, the impact attenuation performance of the polyethylene foam material is still approximately 70 percent of the original impact attenuation value and does not diminish any further. This repeat impact attenuation performance is far superior to current bicycle saddle materials. The implication of this is that a bicycle saddle constructed according to the present invention will still provide a significant amount of comfort to the user even after prolonged use.

The nitrogen blown, cross-linked, closed-cell, high-density polyethylene foam laminate also provides superior resistance to environmental factors. The polyethylene foam material is essentially impervious to water, so it is immune to degradation from exposure to moisture, even after immersion in water for extended periods. Because the polyethylene foam material is cross-linked and because it is blown with pure gaseous nitrogen, it is also highly stable over an extended temperature range. The operating temperature range of the polyethylene foam material is stable from approximately −95° F. to 250° F., which far exceeds the comfortable operating temperature range of the rider. The polyethylene foam material also has significant tensile strength, which allows it to be fashioned into extended coverage, full coverage or wrap-around style without the need for an additional hard shell or other supporting structure. The combined properties of high tensile strength and recovery after impact or deformation makes the bicycle saddle highly resistant to damage from rough handling, such as when a heavy object is accidentally placed on top of it.

The method of manufacture which is part of the present invention is a low pressure compression molding process which simultaneously shapes the bicycle saddle and laminates the upper and lower layers of the bicycle saddle shell. The method allows efficient manufacture of the bicycle saddle at a cost which is competitive with prior art saddles despite the lower raw material costs of the prior art materials used in today's market.

DETAILED DESCRIPTION OF THE INVENTION

Figure 1:
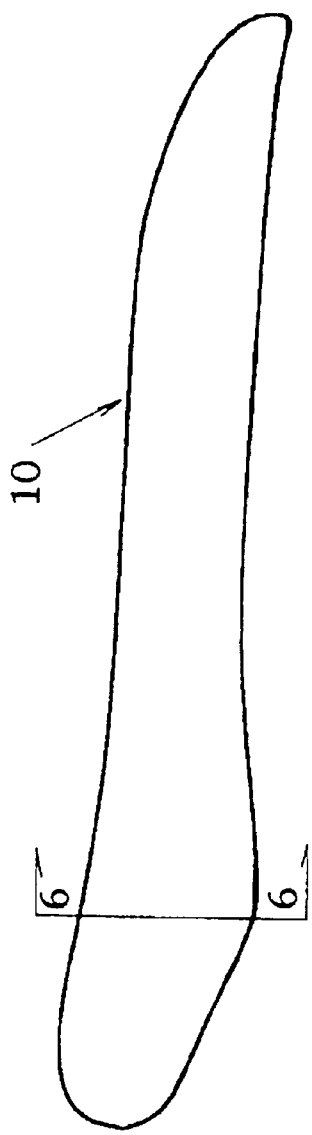
FIG. 1 is an exterior right side view of a bicycle saddle constructed in accordance with the present invention.
Figure 2:
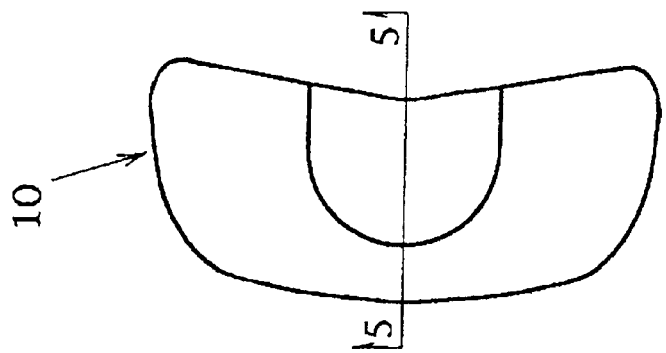
FIG. 2 is an exterior front view of the bicycle saddle of FIG. 1.
Figure 3:
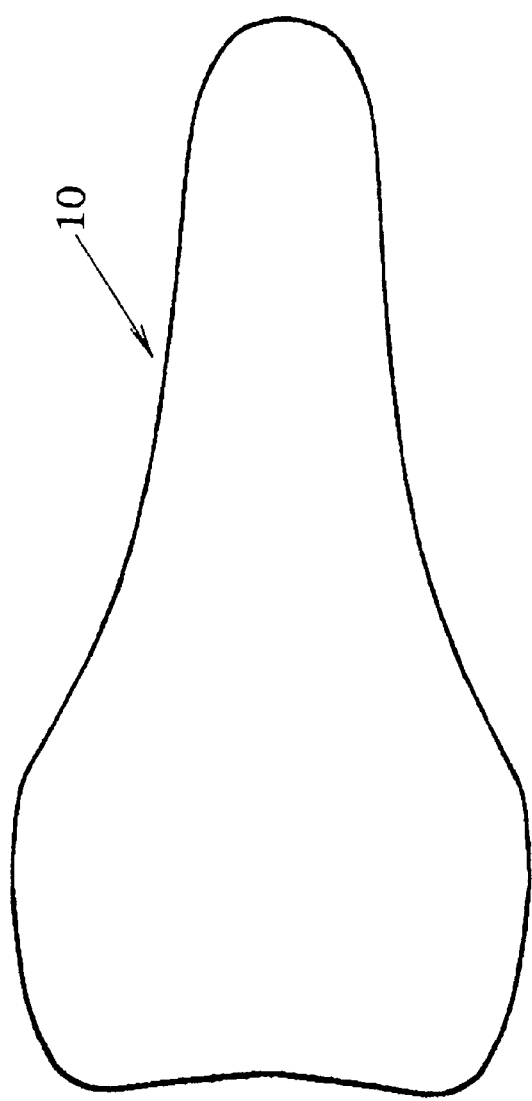
FIG. 3 is a top view of the bicycle saddle of FIG. 1.
Figure 4:
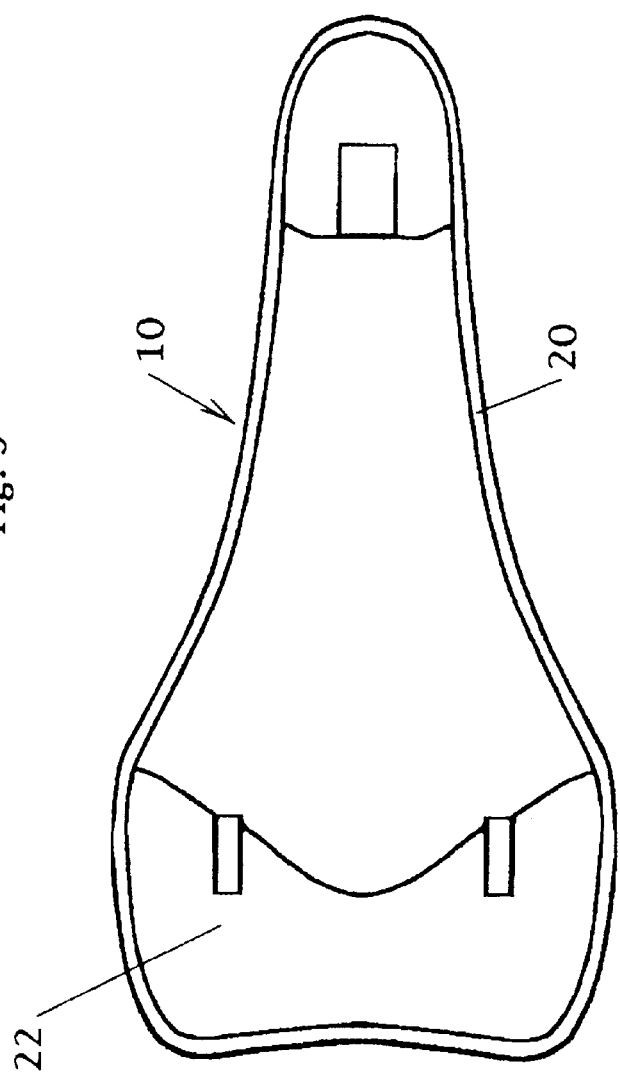
FIG. 4 is a bottom or interior view of the bicycle saddle of FIG. 1.

FIG. 1 is an exterior right side view of a bicycle saddle 10 for bicycle riders constructed in accordance with the present invention. FIG. 2 is an exterior front view of the bicycle saddle 10 of FIG. 1. FIG. 3 is a top view of the bicycle saddle 10 of FIG. 1. FIG. 4 is a bottom view showing the interior of the bicycle saddle 10 of FIG. 1. The bicycle saddle 10 is preferably made with a streamlined aerodynamic shape, such as the one shown in this illustrative example.

Figure 6:
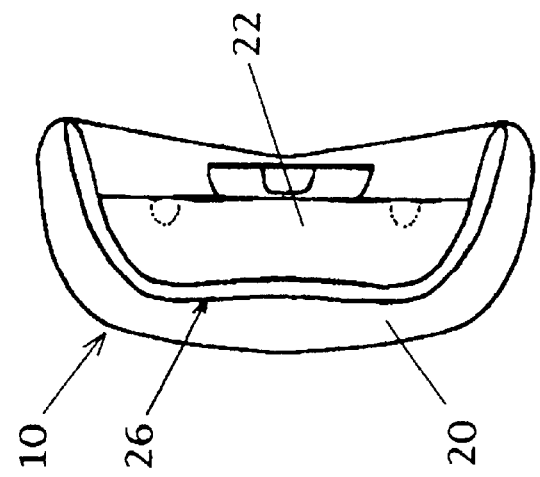
FIG. 6 shows a lateral cross section of the bicycle saddle taken along line 6—6 in FIG. 1.
Figure 5:
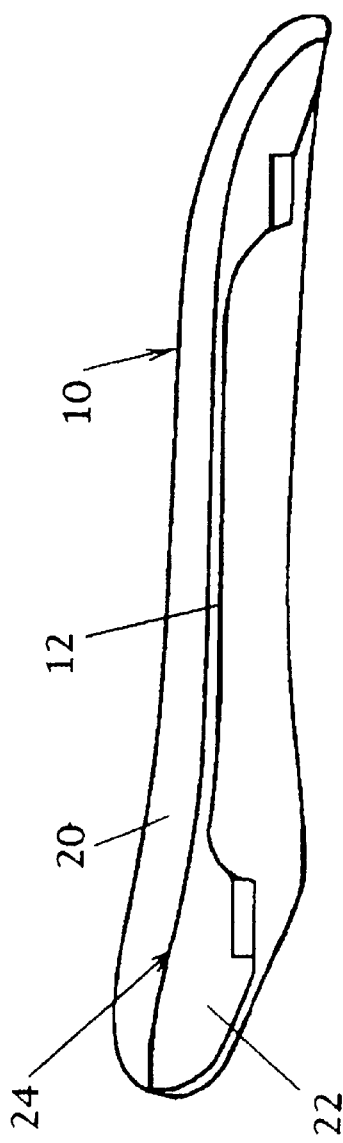
FIG. 5 shows a longitudinal cross section of the bicycle saddle of FIG. 1 taken along line 5—5 in FIG. 2.

In a preferred embodiment, the bicycle saddle 10 of the present invention has a bicycle saddle shell 12 made of a laminated, dual density, closed-cell, foamed polymeric material. FIG. 5 shows a longitudinal cross section of the bicycle saddle 10 taken along line 5—5 in FIG. 2. FIG. 6 shows a lateral cross section of the bicycle saddle 10 taken along line 6—6 in FIG. 1. An upper layer 20 of the bicycle saddle 10 is made of a closed-cell, foamed polymeric material with a relatively low density in the range of approximately 25 to 80 kg m$^{-3}$ (1.5 to 5 pounds per cubic foot), and preferably in the range of 25 to 60 kg m$^{-3}$, for comfort, for absorption of minor impacts and for distributing the stress of a major impact over a larger surface to lessen the likelihood of injury. A lower layer 22 of the bicycle saddle 10 is made of a closed-cell, foamed polymeric material with a higher density in the range of approximately 60 to 115 kg m.$^{-3}$ (3.8 to 7.2 pounds per cubic foot), and preferably in the range of 60 to 80 kg m$^{-3}$, for absorption of major impacts to the bicycle saddle 10 and for providing a rigid structurally stable shell to the bicycle saddle 10. The upper layer 20 and the lower layer 22 of the bicycle saddle 10 are preferably made with a thickness in the range of approximately 5 to 25 mm. The overall thickness of the laminate is preferably in the range of approximately 10 to 30 mm, most preferably in the range of approximately 10 to 40 mm. In one particularly preferred embodiment, the upper layer 20 and the lower layer 22 are made with approximately the same thickness, preferably in the range of approximately 5 to 18 mm. In a second particularly preferred embodiment, the upper layer 20 and the lower layer 22 are made with different thicknesses. For example, the bicycle saddle may be made with a lower layer 22 with a thickness of approximately 20 mm and an upper layer 20 with a thickness of approximately 5 mm. In alternate embodiments, the bicycle saddle may be made with multiple layers of impact absorbing, closed-cell, foamed polymeric material with two, three or more different densities. If desired, an adhesive or an adhesion promoter may be applied at the interface 26 between the upper 20 and lower 22 layers of the laminate to improve adhesion. Additional pads (not shown) may be added to the inside surface 24 of the bicycle saddle 10 for zone comfort. These pads may be permanently attached to the interior of the bicycle saddle. Preferably, the polymeric foam material has sufficient tensile strength so that inserts or other reinforcements will not be necessary for attaching the retention system as they are with prior art bicycle saddle materials.

The preferred material for both the upper 20 and lower 22 layers of the laminated, dual density bicycle saddle 10 is a nitrogen blown, cross-linked, closed-cell, high-density polyethylene foam. The term "high-density polyethylene" is used in its conventional sense here and throughout the specification to refer to a polyethylene material which in its non-foamed state has a density of approximately 0.94 g cm$^{-3}$ (940 kg m$^{-3}$) or greater. This term should not be confused with the bulk density or nominal density of the blown foam material referred to elsewhere in the specification. Suitable nitrogen blown, cross-linked, closed-cell, high-density polyethylene foam for this application is available as PLASTOZOTE® from Zotefoams Limited, 675 Mitcham Road, Croydon, Surrey, England. In one particularly preferred embodiment, the upper layer 20 of the bicycle saddle 10 is made of polyethylene foam with a nominal density of approximately 25 kg m$^{-3}$ (1.5 pcf) designated as VA 25 and the lower layer 22 is made of polyethylene foam with a nominal density of approximately 115 kg m$^{-3}$ (7.2 pcf) designated as HD 115. In a second particularly preferred embodiment, the upper layer 20 of the bicycle saddle 10 is made of polyethylene foam with a nominal density of approximately 25 kg m$^{-3}$ (1.5 pcf) designated as VA 25 and the lower layer 22 is made of polyethylene foam with a nominal density of approximately 80 kg m$^{-3}$ (5.0 pcf) designated as HD 80. In one specific embodiment of the invention, the bicycle saddle 10 is made with a lower layer 22 of 80 kg m$^{-3}$ density polyethylene foam with a thickness of approximately 20 mm and an upper layer 20 of 60 kg m$^{-3}$ density polyethylene foam with a thickness of approximately 10 mm. The high-density polyethylene foam selected for the bicycle saddle construction provides particularly advantageous material properties which cannot be realized with prior art bicycle saddle materials.

The nitrogen blown, cross-linked, closed-cell, high-density polyethylene foam laminate used in the bicycle saddle 10 of the present invention provides greater impact attenuation. The superior impact attenuation properties of the laminate allow a bicycle saddle that meets current standards to be made with a total thickness between approximately 20 and 30 mm. This potentially reduces the weight of the bicycle saddle 10 to under 6 ounces, which improves comfort and reduces fatigue for the user.

The nitrogen blown, cross-linked, closed-cell, high-density polyethylene foam laminate of the bicycle saddle 10 also exhibits higher tensile strength than prior art bicycle saddle materials. The HD 60 material has a tensile strength of approximately 315 psi, the HD 80 material has a tensile strength of approximately 330 psi and the HD 115 material has a tensile strength of approximately 400 psi. The compression strength of the HD 60 material is approximately 44 psi at 25 percent compression and approximately 56 psi at 50 percent compression. The compression strength of the HD 80 material is approximately 86 psi at 25 percent compression and approximately 93 psi at 50 percent compression. The compression strength of the HD 115 material is approximately 104 psi at 25 percent compression and approximately 129 psi at 50 percent compression. The tensile strength, the compression strength and the yield stress of these nitrogen blown, cross-linked, closed-cell, high-density polyethylene foam materials are also significantly higher than for other polyethylene foams formed by other processes, such as by chemical blowing. The improved mechanical properties of these materials makes them superior for application in a bicycle saddle than either the prior art bicycle saddle materials or other known foam materials like chemically blown polyethylene foams. In particular, the higher yield stress of the nitrogen blown, cross-linked, closed-cell, high-density polyethylene foam results in superior impact attenuation performance compared to other impact absorbing foam materials.

The polyethylene foam laminate also exhibits much better recovery behavior than do the bicycle saddle materials of the prior art. Recovery of the polyethylene foam material after minor impacts to the bicycle saddle is immediate and complete. Minor impacts do not measurably deteriorate the impact attenuation properties of the bicycle saddle. Within 24 hours after a major impact to the bicycle saddle, the polyethylene foam bicycle saddle material recovers to the point that the impact attenuation performance for a second impact at the same site on the bicycle saddle is approximately 80 percent of the original impact attenuation value. After repeated impacts at the same site on the bicycle saddle, the impact attenuation performance of the polyethylene foam material is still approximately 70 percent of the original impact attenuation value and does not diminish any farther. This repeat impact attenuation performance is far superior to current bicycle saddle materials. The implication of this is that a bicycle saddle 10 constructed according to the present invention will still provide a significant amount of comfort to the user even after prolonged use.

The nitrogen blown, cross-linked, closed-cell, high-density polyethylene foam laminate also provides superior resistance to environmental factors. The polyethylene foam material is essentially impervious to water, so it is immune to degradation from exposure to moisture, even after immersion in water for extended periods. Because the polyethylene foam material is cross-linked and because it is blown with pure gaseous nitrogen, an inert gas, it is also highly stable over an extended temperature range. The operating temperature range of the polyethylene foam material is from approximately −95° F. to 250° F. (approximately −70° C. to 120° C.). Other polyethylene foams, which are blown with chemical agents, such as azodicarbonamide, may become reactive at temperatures above 130° F. (54° C.), causing changes to the cell structure of the material which may affect its dimensional stability or impact attenuation. The polyethylene foam material also has significant tensile strength, which allows it to be fashioned into extended coverage, full coverage or wrap-around styles without the need for an additional hard shell or other supporting structure. The combined properties of high tensile strength and recovery after impact or deformation makes the bicycle saddle 10 highly resistant to damage from rough handling, such as when a heavy object is accidentally placed on top of it.

Another measure of the protection provided by a bicycle saddle is the impact energy absorption per unit volume of the impact-absorbing material. A method of measuring impact energy absorption per unit volume is described in "The Multiple-Impact Performance of High-Density Polyethylene Foam" by N. J. Mills and A. M. H. Hwang of the School of Metallurgy and Materials, University of Birmingham, England, published in Cellular Polymers, 9, 1989, p 259–276. This method involves impacting a sample of foam material of known dimensions with a striker mass dropped from a known height. The total energy prior to impact can be calculated from the mass of the striker and the height from which it is dropped or, alternatively, from the mass of the striker and the velocity at impact. An accelerometer measures and records the acceleration of the striker during the impact. A stress-strain curve of the impact is plotted based on the recorded acceleration data. The stress is calculated as the striker mass times the acceleration, divided by the area of the impact on the foam. The strain is calculated by numerically integrating the acceleration data from the point of impact once to obtain the striker velocity, then a second time to obtain the striker position and hence the (absolute) strain of the sample. The amount of energy absorbed per unit volume (in metric units of J cm$^{-3}$) of the foam material during the impact can be obtained by numerically integrating the area under the stress-strain curve.

Mills and Hwang define an impact energy absorption value or energy density value for the impact-absorbing foam material which is the amount of impact energy absorbed per unit volume of the foam (in units of J cm$^{-3}$) before an unsafe level of stress occurs. The safe limit for the stress was established at 2.5 MPa (2.5 MNm$^{-2}$) based on historical head injury data. Although collected for head injuries, the information still provides approximate guidelines for acceptable impact strength for other portions of the body. The impact energy absorption value for the foam material is thus obtained by numerically integrating the area under the stress-strain curve below the 2.5 MPa line. The yield stress of the foam material and hence the impact energy absorption value increases with increasing density of the foam. The yield stress varies approximately with the 1.43 power of the density of the foam.

In repeated impact energy absorption testing, the nitrogen blown, cross-linked, closed-cell, high-density polyethylene foam laminate used in the bicycle saddle 10 of the present invention retains a significant percentage of its initial impact energy absorption value. When immediately subjected to a second impact at the same site without a recovery period, the high-density polyethylene foam laminate exhibits an unrecovered impact energy absorption value of approximately 80 percent of its initial impact energy absorption value. If the foam laminate is allowed to recover for 24 hours at 20° C., the recovered impact energy absorption value for a second impact at the same site is approximately 90 percent of the initial impact energy absorption value. The recovery period can be accelerated to 1 hour if the foam material is heated to 50° C. After being subjected to repeated impacts at the same site, the recovered impact energy absorption value of the polyethylene foam material after recovery is approximately 70 percent of the initial impact energy absorption value.

Due to the laminated geometry of the impact-absorbing bicycle saddle material and the nature of the impacts in a typical sporting event, a bicycle saddle 10 constructed according to the present invention exhibits impact attenuation performance and impact energy absorption values equivalent to or better than a bicycle saddle made entirely from the higher density material of the lower layer 22. However, the weight of the bicycle saddle 10 is substantially less because the composite density of the laminate is approximately equal to a volumetric average of the densities of the higher density lower layer 22 and the lower density upper layer 20. The dual-density laminated bicycle saddle 10 exhibits better impact attenuation performance than a comparable weight bicycle saddle that is made entirely of a uniform foam material with a density equal to the average density of the two layers. Thus, the present invention provides a bicycle saddle that is lighter weight than the prior art and has greater comfort. This same effect can be achieved with a multiple-density bicycle saddle made by laminating three or more layers of polymeric foam material having different densities together, preferably with the highest density foam forming the lowermost layer of the bicycle saddle.

For example, the bicycle saddle shell 12 could be made with an upper layer of 30 kg m$^{-3}$ density polymeric foam, an intermediate layer of 60 kg m$^3$ density polymeric foam, and a lower layer of 115 kg m$^{-3}$ density polymeric foam. Alternatively, the impact attenuation performance of the bicycle saddle 10 can be further improved by laminating an intermediate barrier layer of unfoamed material, for example an approximately 0.030 inch thick film of unfoamed 0.94 g cm$^{-3}$ density polyethylene, at the interface 26 between the upper 20 and lower 22 layers of the bicycle saddle 10. The use of a polyethylene barrier layer allows direct lamination between the upper layer 20, the lower layer 22, and the barrier layer of the bicycle saddle 10.

Figure 7:
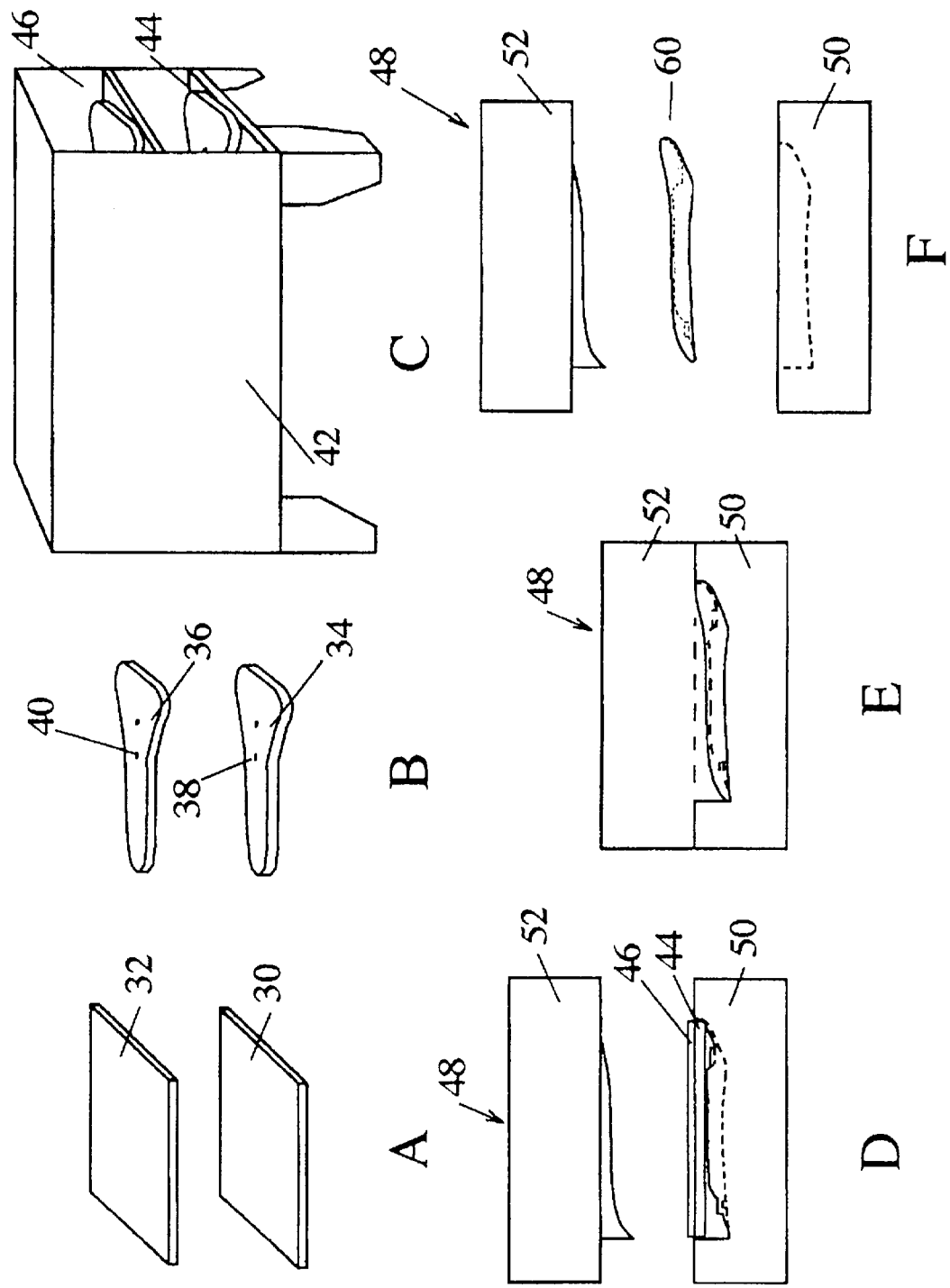
FIG. 7 is a schematic representation of the bicycle saddle manufacturing method of the present invention with the steps of the manufacturing process designated by the letters A through F.

FIG. 7 is a schematic representation of the bicycle saddle manufacturing method of the present invention. The progressive stages of manufacture are designated by process steps A–F in FIG. 7. Step A of FIG. 7 shows the raw material for the laminated, dual-density bicycle saddle construction. The raw materials consist of a first master sheet 30 of closed-cell, polymeric foam material exhibiting the characteristics of resiliency and absorption of minor impacts and a second master sheet 32 of closed-cell, polymeric foam material exhibiting the characteristics of sufficient structural rigidity and impact attenuation of major impacts. In a preferred embodiment of the method, the first master sheet 30 is a sheet of nitrogen blown, cross-linked, closed-cell, high-density polyethylene foam having a density in the range of 25 to 60 kg m$^{-3}$ (1.5 to 3.8 pounds per cubic foot), and preferably in the range of approximately 30 to 60 kg m$^{-3}$. The first master sheet 30 preferably has a thickness in the range of approximately 5 to 25 mm. The second master sheet 32 in this preferred embodiment is a sheet of nitrogen blown, cross-linked, closed-cell, high-density polyethylene foam having a density in the range of approximately 60 to 115 kg m$^{-3}$ (3.8 to 7.2 pounds per cubic foot), and preferably in the range of 80 to 115 kg m$^{-3}$. The second master sheet 32 preferably has a thickness in the range of approximately 5 to 25 mm. The master sheets 30, 32 may have the same or different thicknesses, depending on the design of the bicycle saddle. The master sheets 30, 32 may be produced or purchased with the desired thicknesses, or thicker sheets may be cut to the desired thicknesses using a saw with a vibrating horizontal blade or other suitable cutting device. Alternatively, the master sheets 30, 32 may be made up of multiple thinner sheets of the polymeric foam materials that add up to the desired thicknesses. In an alternate embodiment of the method, multiple thin sheets of polymeric foam materials having three or more different densities that add up to the desired total thickness may be substituted for the dual density master sheets 30, 32 which are shown in step A of FIG. 7.

In step B of FIG. 7, the first 30 and second 32 master sheets are die cut into first 34 and second bicycle saddle 36 blanks. The shape of the first 34 and second bicycle saddle 36 blanks are determined by creating in flat form the profile of the three dimensional shape of the finished bicycle saddle 60. The second bicycle saddle blank 36, since it will become the exterior surface of the bicycle saddle 60, will likely be slightly larger in overall dimensions than the first bicycle saddle blank 34. Some trial and error may be necessary to determine the optimal shapes for the first 34 and second 36 bicycle saddle blanks. The ventilation holes 38, 40 or slots and any attachment holes necessary for the chosen retention system may also be made in the first 34 and second 36 bicycle saddle blanks at this time. In one preferred embodiment of the method, open ventilation holes 38 are cut into the first bicycle saddle blank 34 and narrow slots 40 are cut into the second bicycle saddle blank 36, which widen into open ventilation holes during the course of the molding process. Preferably, the first 34 and second 36 bicycle saddle blanks are die cut using steel rule dies. Alternatively, the first 34 and second 36 bicycle saddle blanks may be cut by hot wire, laser, water jet or other equivalent manufacturing methods.

In step C of FIG. 7, the cold first 34 and second 36 bicycle saddle blanks are individually loaded into a convection conveyor oven 42 which is temperature and speed controlled such that a optimally heated thermoformable hot first 44 and second 46 bicycle saddle blanks exit the oven 42 at approximately 150° C.

Immediately upon exiting the oven 42, the heated first bicycle saddle blank 44 and the heated second bicycle saddle blank 46 are sequentially hand loaded into individual molds 48 in the molding press as shown in step D of FIG. 7. The heated bicycle saddle blanks 44, 46 can be handled using thermal cotton gloves. The lower half 50 of each mold 48 is a positive mold of the interior shape of the bicycle saddle 60 which has vacuum hold down capabilities to hold the bicycle saddle blanks 44, 46 in position. The upper half 52 of the mold 52, which is a negative mold of the exterior shape of the bicycle saddle 60, is indexed closed to compression mold the heated bicycle saddle blanks 44, 46 to final shape, as shown in step E of FIG. 7. Permanent lamination of the first and second bicycle saddle blanks 44, 46 to one another occurs within the mold 48, simultaneously with the shaping of the bicycle saddle 60. If desired, an adhesive or an adhesion promoter may be applied to the first and second bicycle saddle blanks before or after the heating step to improve adhesion between the upper and lower layers of the laminate. Generally, the molded thickness of the finished bicycle saddle is approximately 10% less than the nominal thickness calculated by adding the raw material thicknesses of the component layers. The total thickness of the finished laminate is preferably between 26 and 36 mm. The mold temperature is then water cooled to 120° C., the mold 48 is opened and the finished bicycle saddle 60 is ejected from the mold 48 by reversing the hold down vacuum to positive pressure, as shown in step F of FIG. 7. Cycle time from cold blank to finished bicycle saddle is currently approximately 13–14 minutes.

Quality and density of the raw material is uniform within a very large batch and density can be verified by measuring and weighing master sheets in advance of production. Because of the low temperatures and pressures used in the molding process, the desirable characteristics of the closed-cell, polyethylene foam material are not significantly altered during manufacture of the bicycle saddle. The combination of temperature and pressure used also results in low molded-in stresses in the finished product so that the bicycle saddle is dimensionally stable, even at elevated operating temperatures.

Alternate embodiments may be formed into highly aerodynamic shaped bicycle saddles. This highly aerodynamic embodiment of the invention demonstrates some of the advanced molding capabilities of the bicycle saddle manufacturing process described in connection with FIG. 7. In addition to the ventilation holes previously described, this embodiment could be molded with tapered contoured edges and longitudinal aerodynamic grooves which improve the ventilation, aerodynamics and the styling of the bicycle saddle design. The manufacturing process is also capable of producing other surface contours and features in the bicycle saddle 60 as desired. The closed-cell, polyethylene foam material used for constructing the dual-density foam laminate is commercially available in a wide range of decorative colors, including red, gold, blue, black, gray, silver, white, green, purple and orange. These colored foam materials can be used separately or in combination to add to the visual appeal of the finished bicycle saddle.

The aesthetic appearance of the bicycle saddle of the present invention can be further enhanced with the addition of decorative accessories, such as a decorative bicycle saddle cover. Cloth or mesh covers, can be easily adapted to the bicycle saddle, as can cold weather bicycle saddle covers designed to reduce the ventilation airflow through the bicycle saddle. The construction of the bicycle saddle also lends itself to the addition of a molded decorative bicycle saddle cover which can be permanently or removably attached to the bicycle saddle. In one preferred embodiment, the removable decorative bicycle saddle cover is shaped to cover the top portion of the bicycle saddle 60 and is contoured to follow the aerodynamic grooves of the bicycle saddle 60. Generally, the removable decorative bicycle saddle cover will also include cutouts which correspond to the ventilation holes of the bicycle saddle 60. However, for cold weather use, the cutouts may be reduced or eliminated entirely to decrease the ventilation airflow through the bicycle saddle 60.

To attach the removable decorative bicycle saddle cover, the bicycle saddle 60 is molded with an undercut groove and the cover is formed with a corresponding inwardly turned lip which fits into the groove. The resiliency of the energy-absorbing, closed-cell, polymer foam material of the bicycle saddle 60 allows the bicycle saddle to be molded with undercuts or negative draft angles and still be easily removed from the mold without damage to the bicycle saddle. The resiliency of the bicycle saddle material also allows the removable decorative bicycle saddle cover to be popped onto or off of the bicycle saddle 60 without damage to the bicycle saddle. Alternatively, the removable decorative bicycle saddle cover can be made to cover the entire exterior of the bicycle saddle 60 and the inwardly turned lip can be formed to wrap around the contoured lower edge of the bicycle saddle 60. The resiliency of the bicycle saddle material will allow the bicycle saddle 60 to be popped into the decorative bicycle saddle cover and held in place by the undercut of the lip. The removable decorative bicycle saddle cover can be made in a variety of opaque or transparent colors or patterns. Different bicycle saddle covers can be interchanged to modify the appearance of the bicycle saddle 60. The interior surface of the bicycle saddle cover can be embellished with decals or other decorations so that they are visible through the clear plastic cover. Since the bicycle saddle cover can be easily popped on and off of the bicycle saddle 60, the owner can customize or modify the appearance of the bicycle saddle whenever he or she desires.

Although the examples given include many specificities, they are intended as illustrative of only some of the possible embodiments of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A bicycle saddle comprising:
an upper layer of a first, energy-absorbing, closed-cell, nitrogen blown, cross-linked, high-density polyethylene foam material having a first density in the range of approximately 1.5 to approximately 5 pounds per cubic foot,
laminated to a lower layer of a second, energy-absorbing, closed-cell, nitrogen blown, cross-linked, high-density polyethylene foam material having a second density greater than said first density and in the range of approximately 5 to approximately 7.2 pounds per cubic foot.

2. The bicycle saddle of claim 1 wherein said first density is approximately 3.8 pounds per cubic foot, and said second density is approximately 5 pounds per cubic foot.

3. The bicycle saddle of claim 1 wherein said first density is approximately 1.5 pounds per cubic foot, and said second density is approximately 7.2 pounds per cubic foot.

4. The bicycle saddle of claim 1 wherein said second layer has a thickness of approximately 10 to 30 mm and said first layer has a thickness of approximately 10 to 30 mm.

5. The bicycle saddle of claim 1 wherein said first density is approximately 5 pounds per cubic foot, and said second density is approximately 7.2 pounds per cubic foot.

6. The bicycle saddle of claim 1 wherein said first density of said first closed-cell foam material is approximately 1.5 pounds per cubic foot.

7. The bicycle saddle of claim 1 wherein said first density is approximately 1.5 pounds per cubic foot, and said second density is approximately 5 pounds per cubic foot.

8. The bicycle saddle of claim 1 wherein said bicycle saddle has an initial energy absorption value for a first impact at a location on said bicycle saddle and a recovered energy absorption value for a second impact at the same location on said bicycle saddle which is at least approximately 70 percent of said initial energy absorption value.

9. The bicycle saddle of claim 1 wherein said bicycle saddle has an initial energy absorption value for a first impact at a location on said bicycle saddle and a recovered energy absorption value for multiple impacts at the same location on said bicycle saddle which is at least approximately 60 percent of said first energy absorption value.

10. The bicycle saddle of claim 1 wherein said bicycle saddle has an initial energy absorption value for a first impact at a location on said bicycle saddle and a recovered energy absorption value for a second impact at the same location on said bicycle saddle which is at least approximately 80 percent of said initial energy absorption value and a recovered energy absorption value for multiple impacts at the same location on said bicycle saddle which is at least approximately 70 percent of said initial energy absorption value.

11. The bicycle saddle of claim 1 wherein said bicycle saddle has an initial energy absorption value for a first impact at a location on said bicycle saddle and an unrecovered energy absorption value for a second impact at the same location on said bicycle saddle which is at least approximately 80 percent of said initial energy absorption value.

12. The bicycle saddle of claim 1 manufactured by the process of:
forming a first bicycle saddle blank of said first, energy-absorbing, closed-cell foam material having said first density;
forming a second bicycle saddle blank of said second, energy-absorbing, closed-cell foam material having said second density which is greater than said first density;
laminating said first bicycle saddle blank to said second bicycle saddle blank; and
molding said first bicycle saddle blank and said second bicycle saddle blank into a bicycle saddle shape;
wherein the laminating step and the molding step are performed simultaneously by applying heat to said first bicycle saddle blank and said second bicycle saddle blank and compressing the heated first bicycle saddle blank and the heated second bicycle saddle blank together within a mold.

13. A bicycle saddle shell consisting essentially of:

an upper layer of a first, energy-absorbing, nitrogen-blown, cross-linked, closed-cell, high-density polyethylene foam material having a first density in the range between about 1.5 to about 5 pounds per cubic foot, laminated to a lower layer of a second, energy-absorbing, nitrogen-blown, cross-linked, closed-cell, high-density polyethylene foam material having a second density greater than said first density and in the range between about 5 to about 7.2 pounds per cubic foot.

14. The bicycle saddle shell of claim 13 wherein said first density is approximately 3.8 pounds per cubic foot, and said second density is approximately 5 pounds per cubic foot.

15. The bicycle saddle shell of claim 13 wherein said first density is approximately 1.5 pounds per cubic foot, and said second density is approximately 7.2 pounds per cubic foot.

16. The bicycle saddle shell of claim 13 wherein said first density is approximately 5 pounds per cubic foot, and said second density is approximately 7.2 pounds per cubic foot.

17. The bicycle saddle shell of claim 13 wherein said first density is approximately 1.5 pounds per cubic foot, and said second density is approximately 5 pounds per cubic foot.

18. The bicycle saddle of claim 1 wherein:

said first density is in the range of between about 3.8 to about 5 pounds per cubic foot;

said first layer has a tensile strength of at least about 300 pounds per square inch;

said first layer has a compression strength of at least about 40 pounds per square inch at 25% compression;

said second density is in the range of between about 5 to about 7.2 pounds per cubic foot;

said second layer has a tensile strength of at least about 330 pounds per square inch;

said second layer has a compression strength of at least about 80 pounds per square inch at 25% compression; and said cells of said first and second layers are blown with an inert gas.

\* \* \* \* \*